Nov. 20, 1928.

L. SZABÓ

1,692,593

SHOCK ABSORBER FOR MOTORCYCLES

Filed Jan. 16, 1928

INVENTOR
Louis Szabo
BY
ATTORNEY

Patented Nov. 20, 1928.

1,692,593

UNITED STATES PATENT OFFICE.

LOUIS SZABÓ, OF MONTREAL, QUEBEC, CANADA.

SHOCK ABSORBER FOR MOTOR CYCLES.

Application filed January 16, 1928. Serial No. 247,138.

This invention relates to a new and useful device in the nature of a shock absorber for motorcycles, especially adapted for the purpose of providing a resilient device affording easy riding qualities.

The object of the invention is to provide a shock absorber adapted to be attached to the front fork, front road wheel and the head of the motorcycle frame.

A further object of the invention is to provide a shock absorber adapted to increase the wheel base of the motorcycle as a means of increasing the riding qualities thereof.

Another object of the invention is to provide a shock absorber of novel construction and arrangement of parts hereinafter more fully described, claimed and illustrated in the accompanying drawing.

Figures 1, 2:
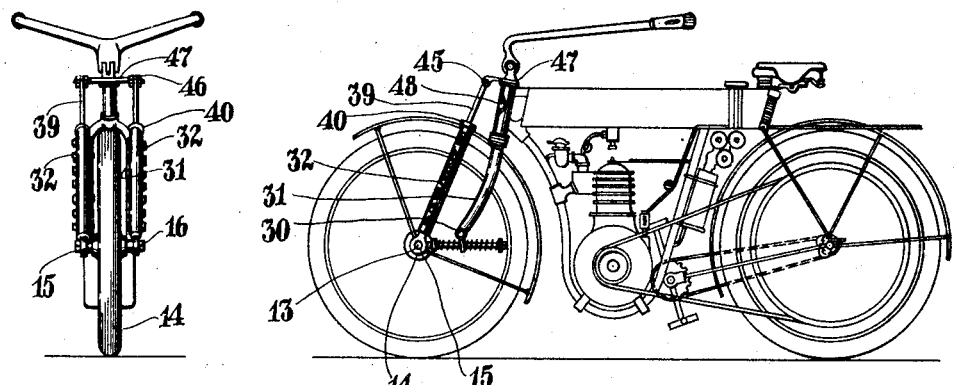
Fig. 1 is a front elevational view of a motorcycle embodying my improved shock absorber.
Fig. 2 is a fragmentary side elevational view thereof.
Figure 3:
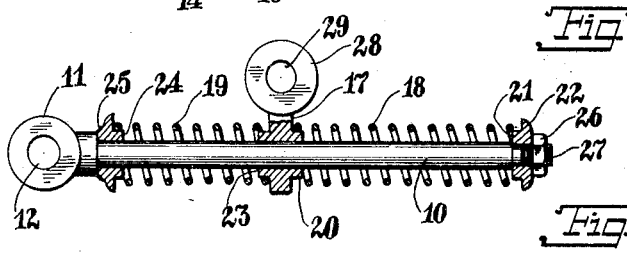
Fig. 3 is an enlarged sectional detail view of the horizontal resilient member as embodied in my improved device.
Figure 4:
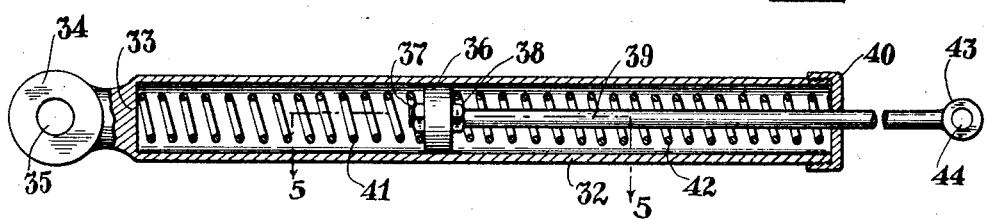
Fig. 4 is a similar sectional view of the inclined resilient member as embodied in my improved device.

As here embodied my improved device comprises a pair of horizontal resilient members of identical construction, consisting of a rod 10 provided with an enlarged head 11 having formed therein an aperture 12, adapted to engage the front axle 13 at both sides of the front road wheel 14 and secured thereto by the nuts 15 and 16. The bracket 17 is slidably mounted on the rod 10 and is normally held in an intermediate position thereon, by means of the expansion springs 18 and 19 wound on the rod 10. The springs 18 and 19 engage over the extended element 20, of the bracket 17 over the extended element 21 of the retaining member 22 and over the extended element 23 of the bracket 17, over the extended element 24 of the retaining member 25. The retaining members 22 and 25, or washers are adapted to engage over the rod 10 and are secured thereto by means of the nut 26, threadedly secured to the free extremity 27 of the rod 10. The bracket 17 is provided with an extended element 28 having formed therein an aperture 29 adapted to receive the pin 30 mounted in the lower extended element of the front fork 31 of the motorcycle.

A pair of inclined resilient members, of identical construction, consisting of a tubular member 32 is provided with a closed lower end 33 having secured thereto at the closed lower end, a lug member 34 having formed therein an aperture 35 adapted to engage the front axle 13 at both sides of the front road wheel 14, adjacent to the above mentioned horizontal resilient members. The piston 36, or plunger is adapted to slidably engage in the tubular member 32 and is secured as at 37 and 38 by nuts to the lower extremity of the rod 39 extended therefrom through an axial aperture formed in the cap 40, threadedly secured to the upper extremity of the tubular member 32. The piston 36 is normally held in proximity to the central portion of the tubular member 32 by means of the expansion springs 41 and 42 positioned in the said tubular member 32 at either side of the said piston. The rod 39 is provided with an enlarged upper extremity 43 having formed therein an aperture 44 adapted to receive the pin 45 carried in the lug element 46 of the bracket 47, secured to the upper portion of the fork 31 of the motorcycle above the head 48 of the motorcycle frame.

It is obvious that the above described construction is such as will permit the horizontal and inclined resilient members to absorb, to a great extent, the road shocks encountered by the front road wheel 14, which will greatly increase the riding qualities of the motorcycle. It is also obvious that my improved device increases the wheel base of the motorcycle in that the front wheel 14 is positioned somewhat ahead of the fork 31, to which the front road wheel 14 is ordinarily mounted.

Figure 5:
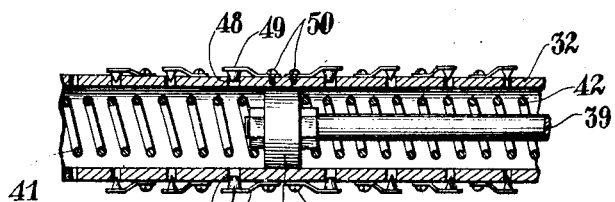
Fig. 5 is a fragmentary sectional detail view of the inclined resilient member, taken on the line 5—5 of Fig. 4.
Figure 6:
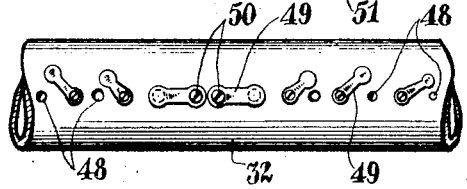
Fig. 6 is an exterior fragmentary view thereof.

In Figs. 5 and 6 of the accompanying drawing, I have shown a plurality of apertures 48 formed in the tubular member 32 in proximity to either side of the normal position of the piston 36. The apertures 48 are of graduated sizes or diameters, the largest of the said apertures are located adjacent to the said piston 36.

The levers 49 are pivotally secured at one extremity, as at 50, to the tubular member 32 and have secured thereto, at their free extremities, plugs 51, frustum conical shaped, adapted to engage in the apertures 48.

The above described construction is such as will permit the apertures 48 to be closed or opened as clearly shown in Fig. 6, as a means of regulating the action of the inclined resilient member. It should be understood that the above described construction will restrict, as may be desired and regulated as above set forth, the intaking and the exhausting of the air to and from the tubular member 32 when my improved device is in use, as a means of increasing the resiliency of my improved device.

Having thus described my invention, what I claim as new and desire to protect by Letters Patent of the United States is as follows:—

1. In a device of the class described, a tubular member provided with closed ends and with a slidable piston having a piston rod extending thru one of the ends, expansion springs acting on opposite sides of the piston, normally holding the piston in an intermediate position in the tubular member, said tubular member being formed with rows of apertures arranged in graduated order and on opposite sides of the piston, and means for closing the apertures.

2. In a device of the class described, a tubular member provided with closed ends and with a slidable piston having a piston rod extending thru one of the ends, expansion springs acting on opposite sides of the piston, normally holding the piston in an intermediate position in the tubular member, said tubular member being formed with apertures of different sizes arranged on opposite sides of the piston, and means for closing the apertures.

3. In a device of the class described, a tubular member provided with closed ends and with a slidable piston having a piston rod extending thru one of the ends, expansion springs acting on opposite sides of the piston, normally holding the piston in an intermediate position in the tubular member, said tubular member being formed with rows of apertures arranged in graduated order and on opposite sides of the piston, and pivoted levers with plugs arranged for closing the apertures.

In testimony whereof I have affixed my signature.

LOUIS SZABÓ.